United States Patent [19]

Kirma et al.

[11] Patent Number: 5,723,819
[45] Date of Patent: Mar. 3, 1998

[54] CONDUCTOR CHANNEL FOR INSTALLING INSULATED ELECTRICAL CONDUCTORS

[75] Inventors: Safa Kirma, Wedel; Gundolf Paul, Boenningstedt, both of Germany

[73] Assignee: Daimler-Benz Aerospace Airbus GmbH, Hamburg, Germany

[21] Appl. No.: 121,635

[22] Filed: Sep. 14, 1993

[30] Foreign Application Priority Data

Sep. 15, 1992 [DE] Germany .................... 42 30 771.6

[51] Int. Cl.⁶ .................................................. H02G 3/26
[52] U.S. Cl. ..................... 174/97; 174/70 C; 174/95; 248/68.1
[58] Field of Search ....................... 174/97, 99 B, 174/70 C, 95, 71 R, 72 B, 72 R, 78; 248/68.1, 72, 73, 74.2; 138/115

[56] References Cited

U.S. PATENT DOCUMENTS

| | | | |
|---|---|---|---|
| 3,804,970 | 4/1974 | Oldman | 174/72 B X |
| 4,255,609 | 3/1981 | Charlebois | 174/78 X |
| 4,781,255 | 11/1988 | Lock et al. | 174/97 |
| 5,377,939 | 1/1995 | Kirma | 248/68.1 |

FOREIGN PATENT DOCUMENTS

| | | |
|---|---|---|
| 20379722 | 8/1990 | European Pat. Off. . |
| 0184931 | 3/1992 | European Pat. Off. . |
| 0380529 | 3/1992 | European Pat. Off. . |
| 1456915 | 9/1966 | France . |
| 726121 | 10/1942 | Germany . |
| 3937371 | 5/1990 | Germany . |
| 0757357 | 9/1956 | United Kingdom ........ 174/97 |
| 0767574 | 2/1957 | United Kingdom ........ 174/97 |

OTHER PUBLICATIONS

"Handbuch fuer Planung, Konstruktion und Montage von schaltanlagen", Herausgeber Brown, Boveri & Cie Aktiengesellschaft Mannheim im Verlag W. Girardet, Essen3, Neubearbeitete Auflage, 1965, p. 550 by Albert Hoppner; also p. 863.

*Primary Examiner*—Hyung S. Sough
*Attorney, Agent, or Firm*—W. G. Fasse; W. F. Fasse

[57] ABSTRACT

A conductor channel is used for the laying of insulated electrical conductors (3) in an air- or spacecraft, whereby the channel can be integrated into a conductor channel system. The conductor channel is made of at least one open hollow section (2), wherein the conductors (3) are held by a retaining strip (8) held in place by edges (7) of the hollow section (2). The strip (8) closes the hollow section. A tension relief element (11) for the conductors (3) is arranged at each channel end. A mounting (13) having upper and lower parts (20, 20') for electrically grounding the hollow section (2) is installed to hold the hollow section (2) next to each tension relief element (11). Spacers (14) may be distributed between the two mountings (13) along the length of the hollow section (2). The mountings (13) are fastened to a support (23). The hollow section (2) is fixed in and fastened to the mountings (13), whereby the free ends of the hollow section (2) may engage a projection (22) of an upper mounting part (20) which snaps in between the edges (7). The projection (22) projects into the hollow section (2) to provide a sufficient stability. Electrically conducting material is used for channel components for including these channels into a protective system against electrical dangers with a mass or ground connector, which is connected to the grounding mounting (13). Transition pieces (12) mounted to the hollow section (2) allow the further connection to another electrical and/or protective conductor system.

16 Claims, 15 Drawing Sheets

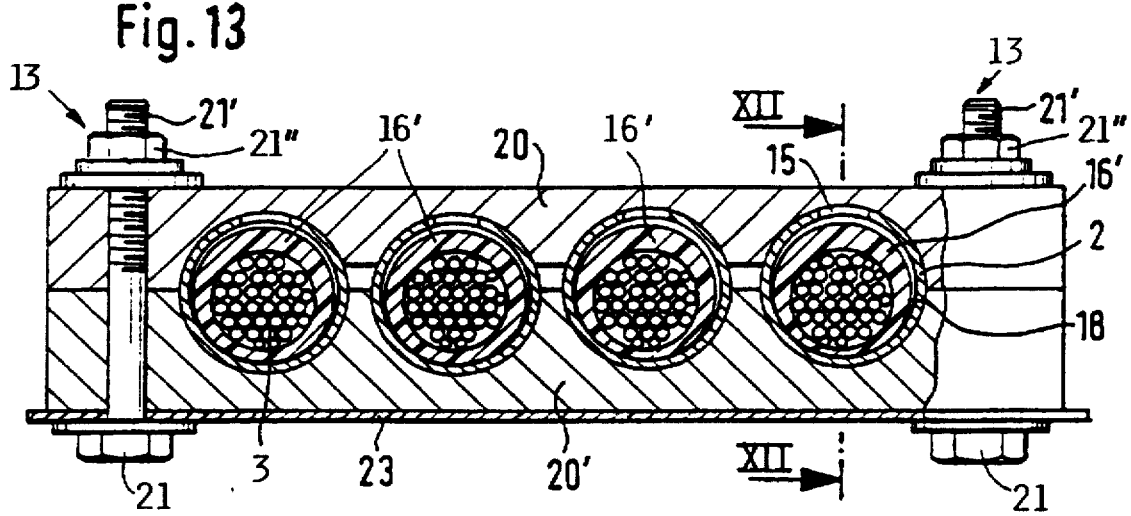
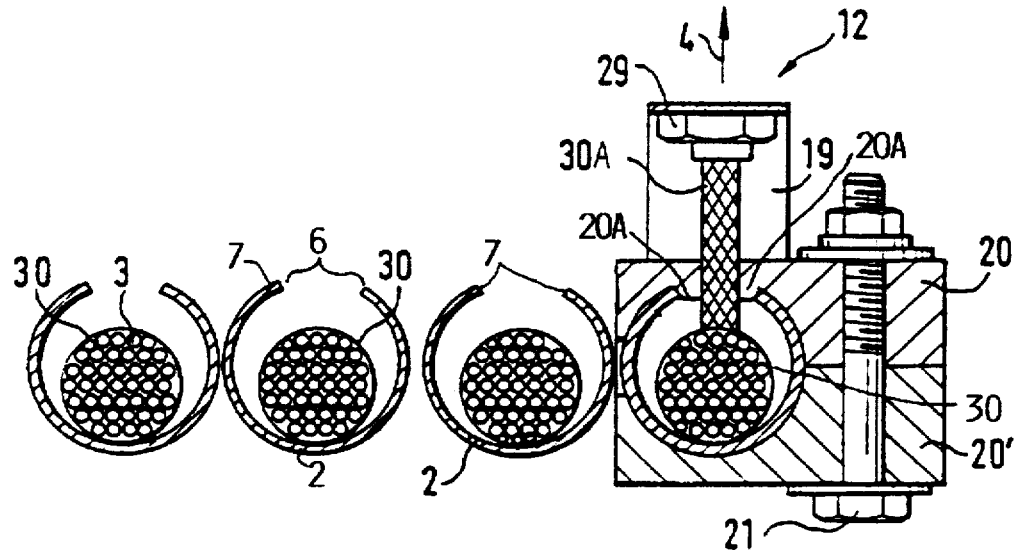

Fig. 21
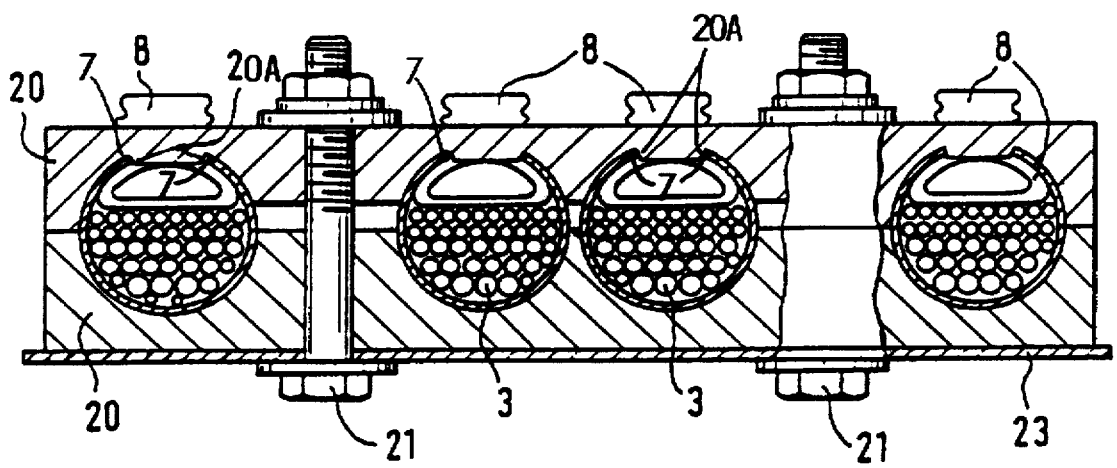
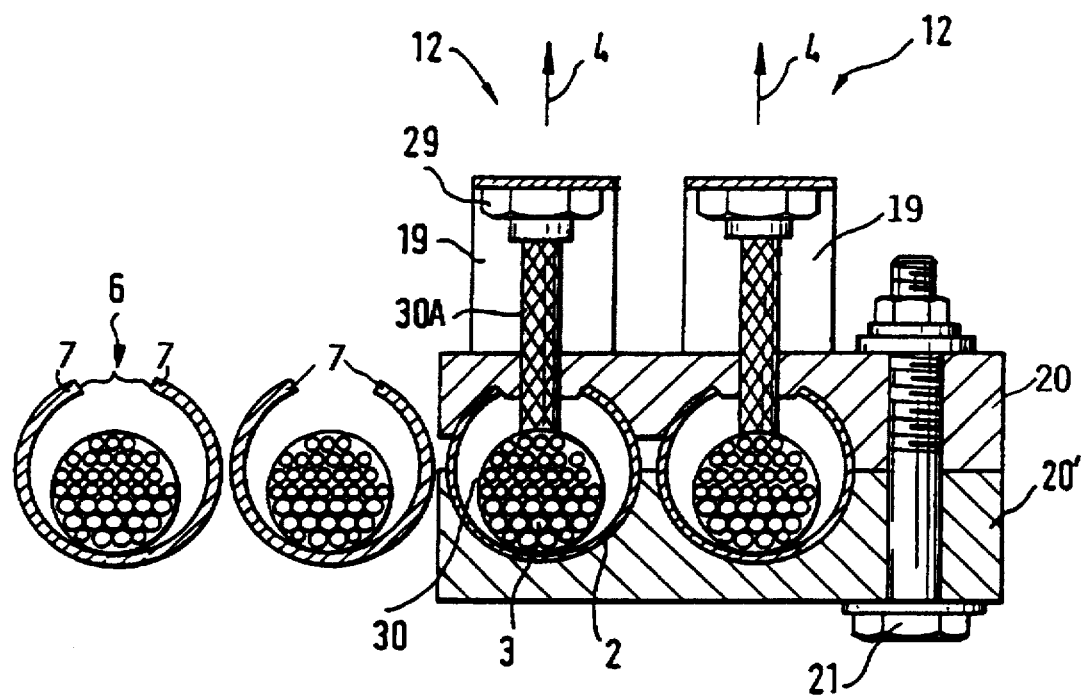
Fig. 22

CONDUCTOR CHANNEL FOR INSTALLING INSULATED ELECTRICAL CONDUCTORS

FIELD OF THE INVENTION

The invention relates to conductor channels for the installation of a wide range of insulated electrical conductors including auxiliary and control conductors in aircraft or spacecraft. It is possible to integrate several conductor channels into a conductor channel system. Such channels allow an efficient conductor laying technology in electrical installations.

BACKGROUND INFORMATION

In the electrotechnical assembly of conductors and cables several techniques are known that make it technologically possible to lay cables and conductors with the help of cable or conductor channels. As shown in a publication by Albert Hoppner, entitled "Manual for the Planning, Construction, and Assembly of Switching Systems", published by Brown, Boveri & Cie AG, Mannheim, printed by W. Girardet, Essen; 3rd, newly revised edition, 1965 on page 550, it is customary that for electrotechnical equipment used, for example, in the construction of industrial plants for the electrotechnical control of processes, the conductors are almost always laid in channels in accordance with connection tables. There are conductor channels made of plastics for surface installation or for recessed laying of conductors in a wall, whereby a large number of conductors can be installed. However, the space factor of plastic channels is limited. A conductor channel made of plastics is shown on page 711 of the above manual.

These traditional techniques have the disadvantage not to be usable in a multitude of ways, whereby an insufficient ability of combining and enlarging individual channel segments into an integrated channel system is not satisfactory.

European Patent Publication EP 0,184,931 B1 corresponds to U.S. Pat. No. 4,781,255 (Lock et al.) and discloses a cable conductor system including of several connectable conductor holding channel elements. These channel elements form several channels for holding diverse conductors. It is a disadvantage of the Lock et al. system that the number of channels formed by channel elements always has to be the same when these elements are connected to form an integrated network. There is no possibility to vary the number of channels. In addition, the channel elements have a certain bending resistance limiting their use. Also, the fastening of the channel elements to a structure is complicated only allowing a single fastening with aligned channel elements. Channels are interconnected by a connecting element which itself is fastened to a support structure by a nut and bolt. The connecting element fixes the cables inside the channels as well as the channel elements by a latch and hold-back member. Further measures are necessary to fix the cables inside the channels correctly requiring an increased attention to the conductor operating characteristics. According to Hoppner (see page 863 of the above mentioned manual) this especially holds true for the heat discharge that is generated during operation and for the protection of conductors against mechanical damage. The permissible load of the cables or of the conductors and their protection against electrical dangers outside the channel system has to be considered and has not been solved satisfactorily hereto fore.

European Patent Publication EP 0,380,529 B1 presents another attempt to provide conductor channels to which the above remarks apply. A rectangular carrier element with a U-shaped channel section has an inner bend along the longitudinal edge of an open section. The integration of several carrier elements into one channel system is possible, but only a straight line installation can be realized. Another disadvantage of the known channels is seen in the fact that without suitable fastening possibilities, which have not been disclosed, it has to be assumed that the above channel system is rather unstable. The above channels also lack suitable features for the correct fixing of the conductors which are laid inside the channel sections. To reduce the system-related instability a stronger material, taking the wall thickness into account, has to be used to make the known channels sufficiently strong. Therefore, much material is necessary to realize the above conductor channels, whereby it is not possible to integrate the above conductor channels into a protective conductor system.

SUMMARY OF THE INVENTION

In view of the above it is an object of the invention to construct a conductor channel of the type described in such a way that it is possible to realize a conductor channel system which has many uses. The present channels are hollow sections that can be assembled into many combinations to form channel systems of any required size. The hollow channel sections allow a correct fixing of the insulated electrical conductors inside the hollow sections. The conductor channel is to be dimensioned to assure a sufficient protection against electrical dangers and it must be tied into already existing protective grounding conductor systems. The present channel system shall satisfy the working conditions for the number of conductors installed in the channels. These conditions require a sufficient protection of the conductors against mechanical damages. Without entailing a great technical and technological effort and expense the present conductor channel shall realize a channel system which has a suitable fastening to a support structure together with a favorable use of material and a low susceptibility to corrosion.

The present conductor channel for the installation of insulated conductors is formed by one or more hollow sections made of electrically conducting material and provides various ways for securing the channel to other structures. The hollow section has a longitudinal slot thereby forming two clamping edges in the wall of the hollow section for holding a retaining strip in the hollow section. These edges of the hollow section extend along the entire length of the hollow section. The retaining strip includes an elastically deformable filler body enclosed in the cross-section of the retaining strip, whereby the filler body presses the retaining strip against the clamping edges of the hollow section to hold the strip and the filler body in the hollow section. The interior surface of the wall of the hollow section is covered with a lining providing an abrasion protection for the conductors in the channel formed by the hollow section. At least one transition piece and one tension relief element or device are secured to the hollow section at the ends of the hollow section facing longitudinally in the direction of the channel formed by the hollow section. The transition piece permits connecting the hollow section to another conductor channel for forming a channel system. The tension relief element or device protects the conductors in the hollow section against tension loads. At least one mounting is arranged next to the tension relief element for electrically grounding the hollow section. One or several spacers are preferably arranged between mountings if more than one such mounting is used. The transition piece is constructed for holding electrically insulated conductors and extends into the hollow section. The transition piece also provides a ground connection to another protective conductor system or a connection to other electrical systems.

The advantages achieved by the invention are mainly seen in an uncomplicated construction of the conductor channel and the possibility of joining hollow sections forming the conductor channel into a conductor channel system usable for many purposes without entailing a special effort and expense. The present system is usable within a broad range of electrical installations, but especially in air- and spacecraft construction.

Various constructions of the geometrical channel configuration or the sectional form of the hollow sections provide the possibility to lay a variable number of insulated electrical conductors with a high space factor inside the channel system. The outward shape of the conductor channel allows a better adaptation of the available space to the local conditions. The suitable fastening and fixing of the conductor channel to and inside of mountings is possible by diverse constructions as shown. Surface treated sheet metal or aluminum- or copper-based alloy can be used for making the hollow sections. These materials counteract increasingly occurring corrosions and abrasion effects. A thin-walled realization of the hollow section effectively puts into practice the demand for saving material and to provide a lightweight construction. The coating of the inner wall surface of the hollow section with an abrasion protection liner lessens the danger of an unintended damage to the conductors by external influences. Enveloping the conductors in a wire mesh hose is advantageous. The construction and shape of the retaining strip with due regard to the material used, takes into account that an advantageous closing of the hollow section or of a suitable covering of the insulated electrical conductors inside the hollow section is required.

A protection against undesired entry of moisture and fouling or against other foreign substances and against accidental touching of the conductors is assured by the form-hugging, flexible, elastic fit between the conductors and the interior wall surface of the hollow section. Since the hollow sections are made of electrically conducting material, such sections can be electrically interconnected while avoiding high transition resistances between interconnected hollow sections, whereby the hollow sections can be included in a protective measure by grounding against electrical dangers.

The elastically deformable filler body that fills a hollow space inside the retaining strip serves totally or partially as a safe fixing of the conductors inside the conductor channel formed by the hollow section or sections. The filler body is of light-weight construction and helps keeping the entire channel light-weight especially when the retaining strip with its filler body has a shape adapted to the shape of the interior wall surface of the hollow section. An additional protection against exterior influences is provided by closing the hollow section lengthwise with the retaining strip and closing the open ends of the hollow section with a conducting end closure. Protection against electrical dangers is assured because the end closure is elastic to fit the shape of the retaining strip and it is conducting for grounding.

The use of transition pieces between hollow sections advantageously allows to tie the hollow sections into a protective conductor channel system or to connect the hollow sections with another electrical system. Preferably, the ends of the hollow sections are constructed as a tension relief device for the insulated electrical conductors inside the hollow section whereby an advantageous centering of the insulated electrical conductors at the ends of the hollow section is assured. If a change in the installation direction of a conductor channel formed by the hollow section or sections is necessary, the hollow section can be bent which favorably facilitates the installation. Due to the preassembly of the hollow sections with holding elements and transition pieces to form welded structures, an advantageous installation of these structures is assured. Furthermore, the stability of a conductor channel formed by the hollow section or sections or of a conductor channel system is strengthened by such welded structures.

BRIEF DESCRIPTION OF THE DRAWINGS

The invention will now be described by way of example with reference to the accompanying drawings, wherein:

FIG. 13 shows a sectional view along section line XIII—XIII in FIG. 12 showing a non-symmetric cross-section of an elastomeric insert (16');

FIG. 14 shows a sectional view through a transition piece (12) secured to a mounting with screwed together upper and lower mounting parts;

FIG. 21 is a sectional view similar to that of FIG. 10, illustrating the position of the retaining strips (8) behind the sectional plane and behind the upper mounting part (20);

FIG. 22 is a sectional view similar to FIG. 14, however with two transition pieces (12);

DETAILED DESCRIPTION OF PREFERRED EXAMPLE EMBODIMENTS AND OF THE BEST MODE OF THE INVENTION

Insulated electrical conductors 3 are shown in an end view rather than in section to simplify the illustration of the sectional views.

Figure 1:
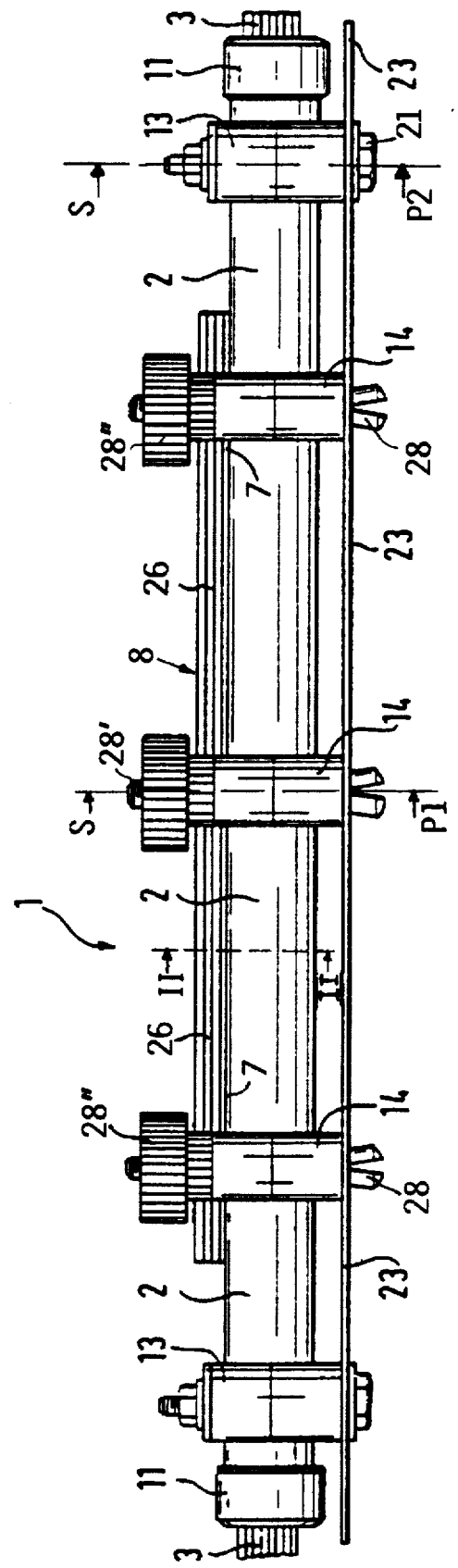
FIG. 1 shows a side view of a conductor channel formed by at least one hollow section (2) according to the invention with mountings (13) for grounding, with spacers (14) and with tension relief devices or elements (11)

FIG. 1 shows a side view of a conductor channel system 1, simply referred to as conductor channel 1, for the installation of insulated electrical conductors 3. The conductor channel 1 comprises at least one hollow section 2, 2' of finite length attached to a support 23 by mountings 13 and spacers 14. The construction of the spacers 14 is, for example, shown in FIG. 3 which is a sectional view substantially along section plane S-P1 in FIG. 1. The construction of the mountings 13 is shown, for example in FIG. 10 which is a sectional view substantially along section plane S-P2 in FIG. 1. The hollow section 2 is held in place by these mountings 13 and spacers 14. The hollow sections can have a rectangular, cylindrical, prismatic, or circular cross-section. In the shown examples the hollow sections 2, 2' have a circular cross-section.

The conductors 3 are placed inside the hollow sections 2 through a longitudinal slot 6 (see FIG. 7) flanked by longitudinal edges 7. The conductors 3 are held in place at the conductor ends by a tension relief device or element 11 that takes up tension effective longitudinally. The mountings 13 are used for electrically grounding the hollow sections 2. Each mounting 13 is arranged next to a tension relief device or element 11 at the ends of the hollow section (2). Several spacers 14 are distributed along the length of the hollow section 2 between the mountings 13.

The mountings 13 and spacers 14 additionally provide sufficient stability for the conductor channel system by their structural attachment to a support 23. The combination of several hollow sections 2 into a conductor channel 1 is possible, whereby the hollow sections 2 are arranged in parallel to each other as seen, for example in FIG. 3 and with a spacing between neighboring hollow sections. However, in FIG. 35 neighboring hollow sections in a channel system touch each other.

The hollow sections 2 are made of an electrically conducting material that is chosen with regard to the material's structural dimensioning. The hollow sections 2 are grounded by the mountings 13 which are also made of electrically conducting material connected to a protective conductor system for example in the form of a lightning protection system.

The hollow sections 2 are preferably cut from sectional stock that can have different sectional configurations along its length, preferably a square or a rectangular or a trapezoid or an elliptical cross-section. However, a circular section is most preferred. Each hollow section 2 has the above mentioned longitudinal slot 6 in the section wall 5, whereby the sections are initially open to the insertion of the conductors 3 through the slot 6 during installation. As mentioned, the hollow sections 2 are made of electrically conducting material, such as iron or cast iron or of a nonferrous- or lightweight metal or of a conducting synthetic material, whereby preferably a metallized synthetic material is used.

The hollow section 2 is made for example of sheet metal which preferably is surface treated or surface finished, or it may be made of a copper or aluminum alloy. The surface treating or surface finishing material is preferably selected from the group of chromium, cadmium, nickel, silver, gold or galvanized material. The interior wall surface of the hollow section 2 normally conforms to the cross-section of the hollow section 2 and is provided with a lining to protect the conductors 3 against abrasion that could damage the conductors 3. The lining is preferably a synthetic material- or a rubber-elastic coating. However, a lining of a web-like or synthetic-material like or rubber-like insert is quite practicable. The insulated electrical conductors 3 can additionally be protected against abrasion by placing them separately inside a mesh hose 30, not shown in FIG. 2 but seen in FIGS. 11, 12 and 33, for example.

In FIG. 1 the mountings 13 are held together and to the support 23 by a bolted connection 21. The spacers 14 are held together by threaded bolts 28' having an expansion head 28 and a nut 28". The expansion head 28 secures the respective spacer to the support 23.

Figure 2:
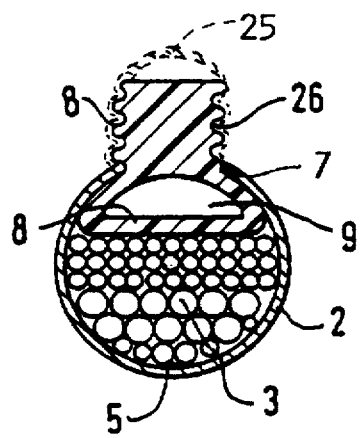
FIG. 2 shows a sectional view along section plane II—II in FIG. 1 through the hollow section (2) and through a retaining strip (8) with corrugated sides (26)
Figure 5:
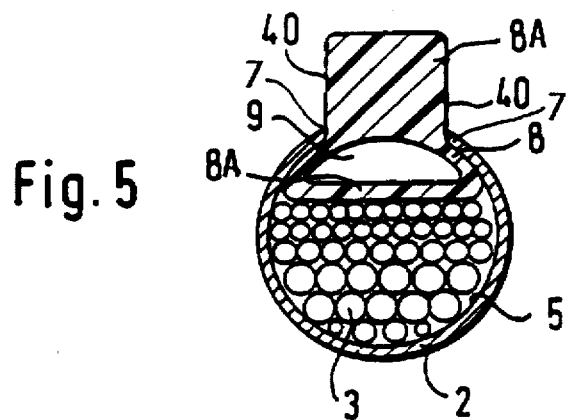
FIG. 5 is a sectional view similar to that of FIG. 2, however showing a retaining strip (SA) having smooth sides (40)
Figure 6:
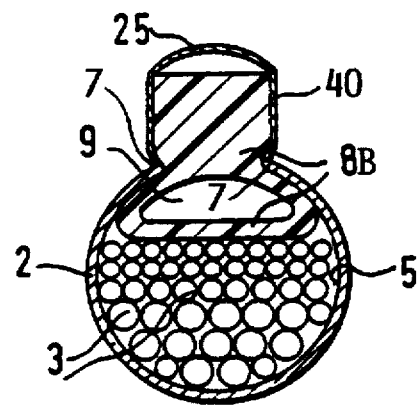
FIG. 6 shows a sectional view similar to that of FIG. 5 with a retaining strip (SB) enclosed by a conducting layer (25)

Each of FIGS. 2, 5 and 6 shows a different retaining strip 8, 8A, 8B in a sectional view. The walls 5 of each of the hollow sections 2 is cut open to form the longitudinal slot 6 and the longitudinal clamping edges 7 for holding the retaining strips 8, 8A, 8B. The slot 6 is best seen in FIGS. 7, 24, 25, 26, and 27. The open hollow sections 2 are closeable along the longitudinal slot 6 by any one of the retaining strips 8, 8A, 8B flexibly held in place by the clamping edges 7. A predominantly elastic, shapeable filler body 9 is enclosed in the retaining strips. This filler body can be made of an expanded rubber or sponge rubber or of synthetic material. The filler body 9 may fill the space inside the retaining strips 8, 8A, 8B completely or partially to hold the insulated electrical conductors 3 inside of the hollow section 2 when the retaining strips 8, 8A, 8B have a portion shaped to conform to the interior configuration of the hollow section 2.

The realization of the retaining strips 8, 8A, 8B without an additional filler body 9 in the retaining strips is possible, whereby the retaining strips 8, 8A, 8B may remain hollow or be filled with pressurized air.

In FIG. 2 the retaining strip 8 has corrugated side walls 26 to obtain a better hold between the interior surface of the wall 5 and the strip 8, especially along the edges 7. These corrugations 26 are preferably worked into the rubber profile of the retaining strip 8. Preferably, the outer surface of the retaining strips is clad or coated with an electrically conducting layer 25 shown in more detail in FIG. 6. The layer 25 may be applied if the side wall of the retaining strip 8 has corrugations 26 (FIG. 2) or if the side wall 40 of the retaining strips 8A, 8B is plane as shown in FIGS. 5 and 6. When the side walls 40 are plane, it is preferred to fix the retaining strips 8A, 8B in their position along the clamping edges 7 by cable clamps 32 shown in FIG. 17.

The clamping edges 7 can have the cross-sectional shape of a parallelepiped with a rectangular or square cross-section or with a prism cross-section or that of a divided prism with a trapezoidal cross-section. These edges 7 can also have the shape of a prism with partially rounded off surfaces having a circular arc shape defining a cylinder configuration. The preferred shape of the edges 7 is adapted to the shape of the hollow profile 2. If the clamping edges 7 are made of synthetic material or of rubber, they may be electrically conducting or nonconducting. However, a conducting material is preferred, whereby a conducting composite material, preferably a conducting synthetic material metal combination, or a conducting rubber material is used. For this purpose conducting particles, preferably gold or silver or copper or nickel or iron are added to the composite- or rubber-material. The surface of the clamping edges 7 is then, circumstances permitting, additionally covered with a conducting coating, preferably selected from gold, silver, copper, cobalt, chromium, indium, rhodium, tellurium, tantalum, chromium-nickel or iron nickel.

If the layer 25 is applied to the retaining strip 8 as shown in dashed lines in FIG. 2 or as shown in full lines in FIG. 6, such layer 25 has a thin layer thickness which is preferably uniform and has the ability to elastically change its shape. The open ends of the hollow section 2 are closed by the conducting layer 25, which is in electrically conducting contact with the retaining strip 8 or 8B and with the hollow section 2. The conducting layer 25 should be made of the same material as that used for making the hollow section 2. The sectional shape of the conducting layer 25 is to be adapted to the shape of the retaining strips 8, 8A, 8B, whereby a U-, V-, C-, or I-cross-sectional shape is possible. If the layer 25 is applied to the corrugations 26 as shown in FIG. 2, the layer 25 must conform to these corrugations 26 to assure proper surface contact. If needed, the layer 25 can be adapted to the exterior structure of the retaining strip 8, 8B with the help of recesses running crosswise to the length of the retaining strip.

Figure 3:
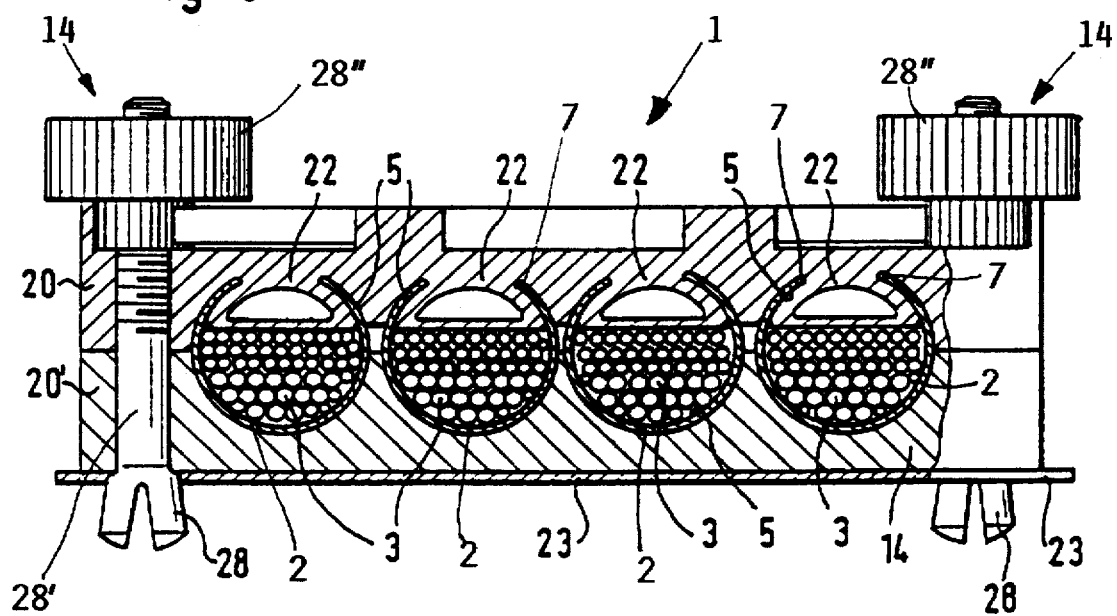
FIG. 3 shows a sectional view along section plane (S-P1) through several hollow sections (2) positioned in parallel to each other in a mounting forming a spacer (14) held together by screw connections, wherein an upper mounting part (20) has projections (22)
Figure 4:
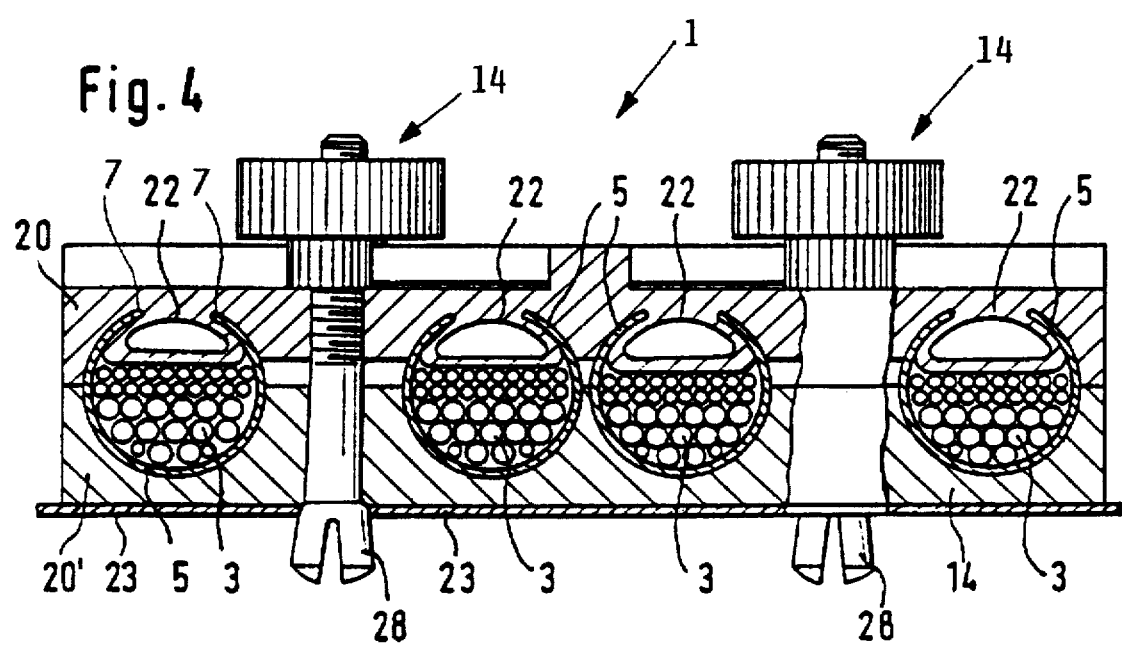
FIG. 4 shows a modified construction compared to FIG. 3 with differently positioned threaded bolts.

FIGS. 3 and 4 show a sectional view of the conductor channel 1 with four similar hollow sections 2 arranged in parallel to each other. Retaining strips 8 according to FIG. 2, 5, or FIG. 6 are used but not seen in FIGS. 3 and 4. The hollow sections 2 are held in place on the support 23 by mountings 13 and spacers 14. Only spacers 14 are seen in FIGS. 3 and 4. The spacers 14 comprise two different mounting parts 20 and 20' between which the hollow sections 2 are held and fixed to the support 23. The spacers 14 are positioned at defined spacings from each other as shown in FIG. 1. The mounting parts 20 and 20' of each spacer 14 are fixed to the structure 23 by bolted connections each including the above mentioned threaded bolts 28' with spreader heads 28 and nuts 28". The upper mounting part 20 has projections 22 which extend into the slot 6 between the edges 7 of the hollow sections 2 where the strip 8 is interrupted by the part 20 so that a sufficient gripping of these hollow sections 2 is assured. The hollow sections 2 are filled with the conductors 3 in such a way that electromagnetic fields do not have any disturbing effect through the longitudinal slot 6 since the slots are closed by the retaining strips and their conducting layer 25 and/or the conductors 3 are enclosed by a wire mesh hose 30.

The conductors 3 are held in their position by the retaining strips 8 which are in turn held by the clamping edges 7 and by pipe clamps 17A, if such clamps are used as described above. The retaining strips 8 are pressed into the hollow sections 2, where by the retaining strips 8, due to their highly elastic characteristic, if for example a rubber profile is used, adapt themselves to the surface of the insulation of the electrical conductors 3.

If the retaining strips 8, 8A, 8B are provided with the above mentioned corrugations 26 different filling heights of the conductors 3 can be compensated by inserting the retaining strip more or less into the hollow section. The retaining strips may be positioned only between the mountings 13 and spacers 14 or the retaining strips may pass through the mountings 13 and spacers 14, whereby the length of the retaining strips may be interrupted or uninterrupted, respectively.

As mentioned above, the interior wall of the hollow sections 2 can have a plastic coating which protects the conductors 3 against abrasion. The hollow sections 2 may be bent if the direction of the conductor channel 1, must be changed. Thus, a conductor channel system can be realized without entailing a larger effort and expense and with an easy installation.

Due to a longer installation length of the present conductor channel system, the number of air gaps between the hollow sections 2 can be reduced to a minimum, thereby reducing any ingression of electro-magnetic fields which are effective from the outside. The fixing of the conductors 3 inside the hollow sections and fastening of the hollow section 2 with the slot 6 facing upwardly, as shown in the figures, satisfies the requirement of a sufficient shield against these fields. An additional protection screen against exterior field impacts of this kind is possible by enclosing the retaining strip 8, 8A, 8B with the conducting cover or layer 25 and by closing the face ends of the hollow sections 2 as described above. The use of a retaining strip 8, 8A, 8B and the deliberate contacting with the conducting cover 25 improves the screening against exterior effects.

The upper and lower parts 20 and 20' of the mountings 13 and of the spacers 14 are substantially of the same construction. However, the spacer parts are made advantageously of synthetic material while the mounting parts are made of a conducting material or a conducting synthetic material.

The difference between FIG. 3 and FIG. 4 is the position of the spacers 14 outwardly in FIG. 3 and inwardly in FIG. 4, whereby the fastening to the support 23 requires only little space while FIG. 4 is advantageous for the distribution of mechanical tension on the hollow sections 2.

Figure 7:
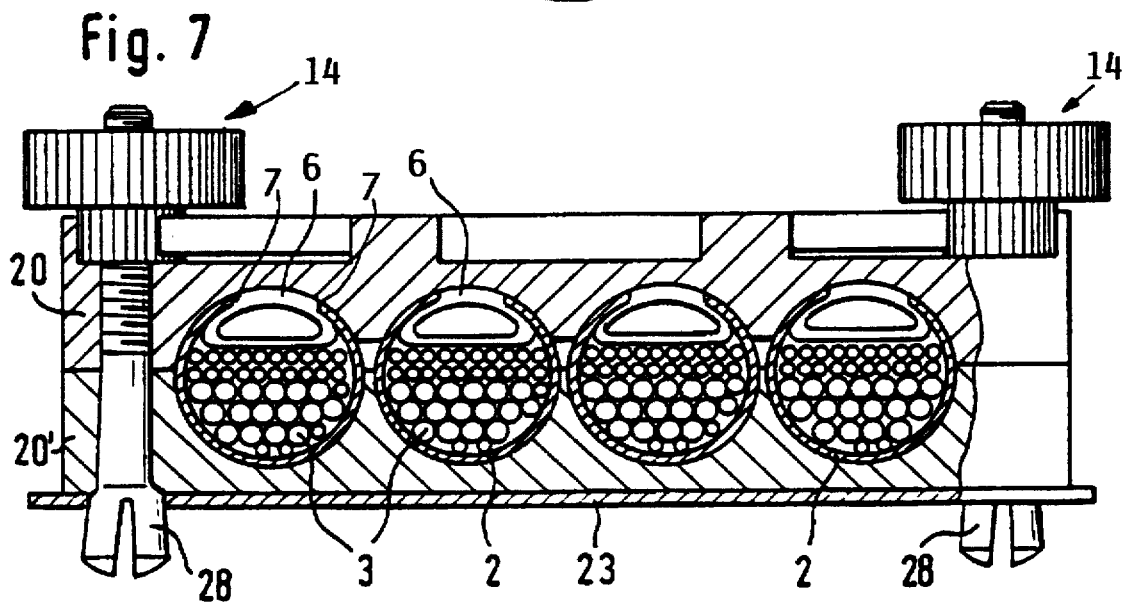
FIG. 7 is a sectional view similar to that of FIG. 3, however in FIG. 7 the upper mounting part (20) does not have projections (22)

Similar considerations apply to FIG. 7. However, in FIG. 7 the retaining strips can pass uninterrupted at least partly through the part 20 as permitted by the slot 6, while in FIGS. 3 and 4 the projection 22 of the upper part 20 requires interruption of the respective retaining strip.

Figure 8:
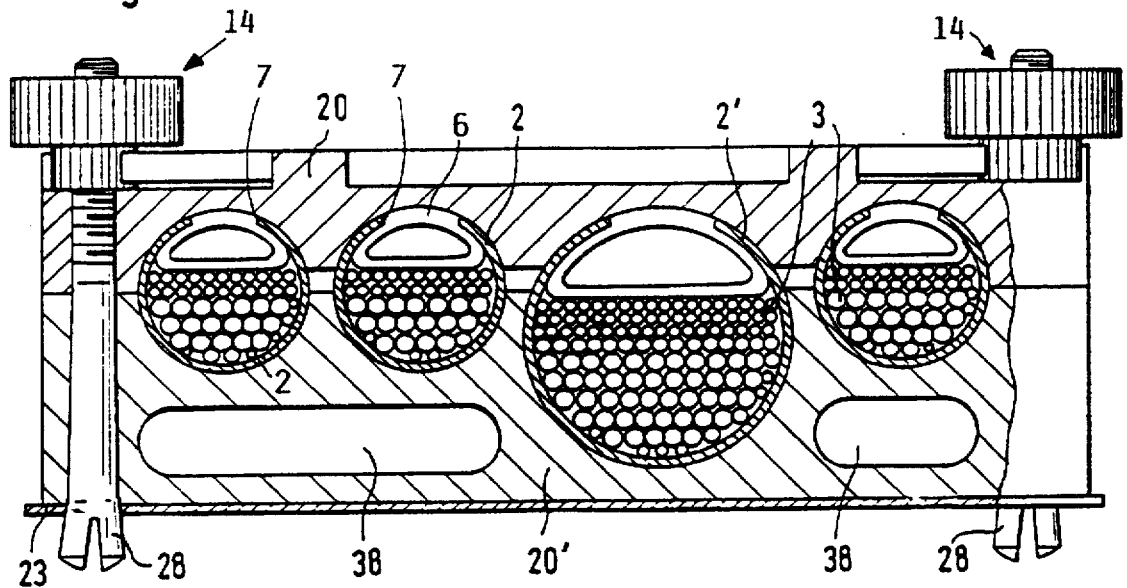
FIG. 8 is a sectional view similar to that of FIG. 3 with hollow sections (2, 2') having different cross-sectional dimensions and with openings (38) in a lower mounting part (20')

FIG. 8 shows a modified arrangement similar to FIG. 3, however in FIG. 8 one hollow section 2' has a larger cross-section than three smaller hollow sections 2. Each of the smaller sections 2 has the same size. All sections 2, 2' are gripped between the upper part 20 and the lower part 20' held together by the bolts with spreader heads 28. For reducing weight, openings 38 are worked into the lower part 20'.

Figure 9:
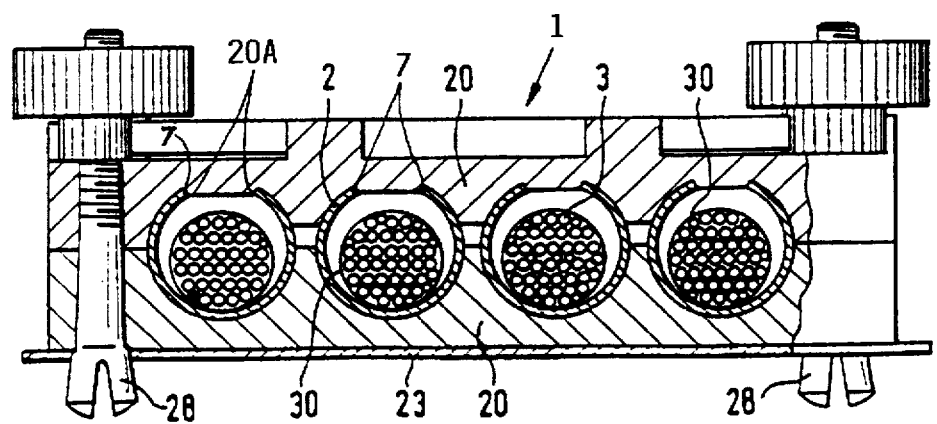
FIG. 9 is a sectional view through a mounting similar to FIG. 3, wherein edges (7) of the hollow sections (2) bear against stops (20A) of an upper mounting part (20)

FIG. 9 shows a modified form of a conductor channel 1 in comparison to FIG. 3. In FIG. 9 the insulated electrical conductors 3 are enclosed inside the mesh hose 30, which, for example, may be made of a textile or a synthetic material coated fabric. The mesh hose 30 is inserted with the conductors 3 into the open hollow section 2 through the slot 6 by flattening the hose somewhat. In this case the interior surface of the wall 5 of the open hollow section 2 does not have a synthetic material coating. The assembly of the conductors 3 forming a conductor bundle inside the mesh hose 30 provides an inertia mass which dampens vibrations or impacts of the individual conductors 3 whereby abrasion of the conductors 3 is substantially reduced.

Figure 10:
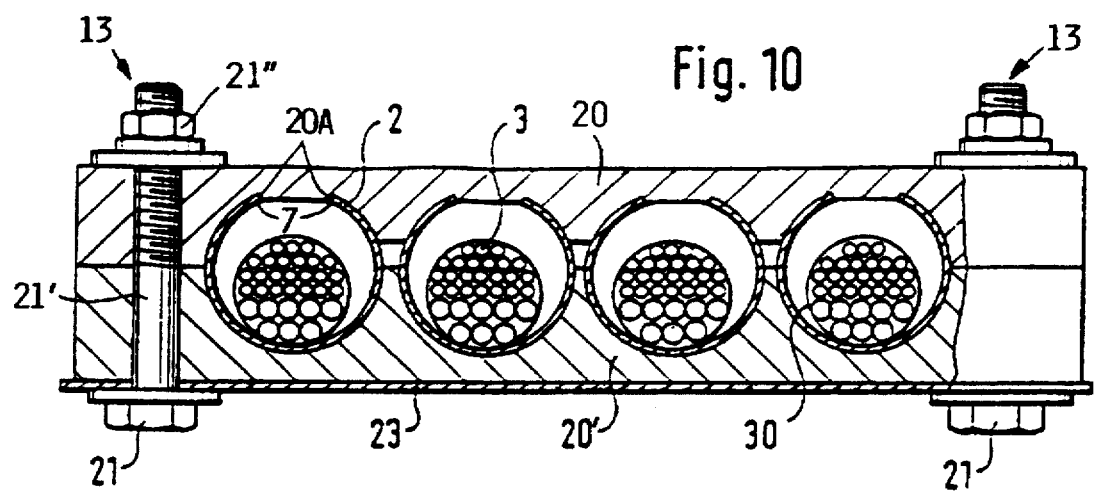
FIG. 10 is a sectional view along section plane (S-P2), in FIG. 1, wherein threaded bolts (21') with screw heads rather than expansion heads, secure the upper and lower mounting parts (20, 20') together.

FIG. 10 shows a sectional view of a mounting 13 for providing an electrically conducting connection to ground. The sectional view extends approximately in the section plane S-P2 in FIG. 1. The mounting 13 comprises an upper part 20 and a lower part 20' and these parts are held together by bolted connections 21 including a threaded bolt 21' and a nut 21" as mentioned above. The parts 20, 20' that form the mounting 13 and hold the hollow sections 2 together are made of an iron- or cast iron material or of a nonferrous- or light metal or of a conducting synthetic material.

Figure 11:
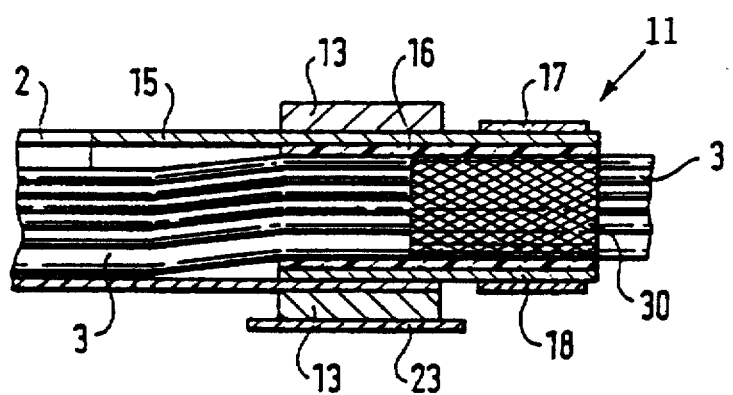
FIG. 11 shows a section through a tension relief device or element (11)
Figure 12:
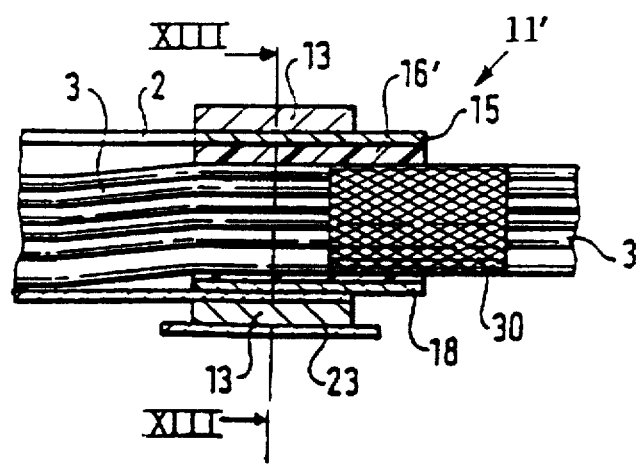
FIG. 12 shows a sectional view along section line XII—XII in FIG. 13 illustrating a different tension relief device (11')

FIGS. 11 and 12 show the construction of the tension relief device or element 11, 11' whereby the section plane coincides with the plane of the drawing sheet of FIG. 1. The tension relief device or element 11 shown FIG. 11 comprises a support bushing 15, 18, an elastomeric insert 16 forming a filler body and a clamp 17. The elastomeric insert 16 in the form of a rubber sleeve surrounds the insulated electrical conductors 3 which are covered with the mesh hose 30. This arrangement is inserted into the support bushing which includes an upper half shell 15 and a lower half shell 18 made of a metallic material. The half shells 15 and 18 are conductingly connected with the hollow section 2. The clamp 17 holds the half shells 15 and 18 and the insert 16 together and fastens these elements 15, 16, 18 to the hollow section 2 with the help of the mounting 13 of which the connecting bolts are not shown in FIGS. 11 and 12.

The conductors 3 are protected by the elastomeric insert 16 and are centered in the ends of the hollow section 2 by the half shells 15, 18. The centering may be facilitated by a slotted bushing made of metal or rubber inserted into the hollow section 2. In FIG. 11 the upper half shell 15 is longer than the shorter lower half shell 18 because when a maximum space factor is maintained inside the hollow section 2, the bundle of conductors 3 lifts up somewhat when the above described tension relief device 11 or rather the mounting 13 is tightened. In this construction the upper half shell 15 has the effect of a screen cover for the lifted conductor bundle. Both half shells 15, 18 are electrically connected with the wall 5 of the hollow section 2 for grounding. The elastomeric insert 16 serves as a protection of the conductors 3 against the effect of the contact pressure applied by the clamp 17, which fastens the conductors at the end of the hollow section to thereby relieve tension on the conductors 3. In addition to this measure the mesh hose 30 may be lifted off the conductors 3 and pulled over the outer surface of the wall 5 of the hollow section 2 and fastened with the clamp 17. The individual conductors 3 of the conductor bundle are held together by the tight fit of the mesh hose 30, whereby protection against unintended relative motions is assured.

FIG. 12 shows a sectional view along section line XII—XII in FIG. 13 of a modified tension relief device 11'. In this embodiment the elastomeric insert 16' is arranged eccentrically to reduce the vertical lifting of the conductor bundle outside of the hollow section 2 when the mounting 13 is tightened. In FIG. 12 the two metal half shells 15, 18 have the same length and the mesh hose of fabric 30 has an excess length to project from the half shells 15, 18. The contact pressure provided by the mounting 13 when it is tightened provides the tension relief for the conductor bundle. An additional clamp 17 as shown in FIG. 11 is not necessary in the embodiment of FIG. 12.

FIG. 13 shows a sectional view along section line XIII—XIII in FIG. 12, wherein the mounting 13 made of metal for grounding holds four hollow sections 2. The half shells 15, 18 of the tension relief device together with the elastomeric insert 16' are provided individually for each of the hollow sections 2 which are clamped between the upper and lower parts 20, 20' of the mounting 13 with the help of the bolted connection 21 including the threaded bolt 21' and the nut 21" in the same construction as in FIG. 10. FIG. 13 illustrates that the elastomeric inserts 16' are thickest in their upper portion and taper in their wall thickness downwardly toward a thinnest portion. In all embodiments the use of the mesh hose 30 is preferred but not necessary.

FIG. 14 shows a transition piece 12 for connecting the insulated electrical conductors 3 of any hollow section 2 to conductors 4 of another hollow section. The conductors 3 are surrounded by a mesh hose 30, 30A whereby the hose 30A branches out of the hollow section 2 through the slot 6. With the help of the transition piece 12 the grounding can be connected with another protective conductor system such as a lightning electrical grounding to protect against possibly occurring electrical dangers. Alternatively, the transition piece 12 can hold a connection to further electrical systems.

The transition piece 12 comprises an upper mounting part 20 and a lower mounting part 20' fixed to each other by a bolted connection 21. The upper and the lower parts 20 and 20' form a mounting for the hollow section 2. The upper part 20 forms stops 20A extending into the slot 6 of the hollow section 2 to contact the edges 7. An angular bracket 19 is secured to the upper part 20 to hold a connection to another second conductor system. A lead through is fastened to the angular bracket 19 with a screw connection including a nut 29.

Figure 15:
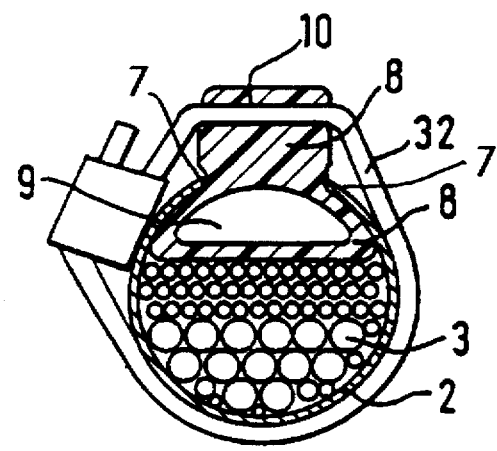
FIG. 15 shows a cable clamp (32) in a position securing the retaining strip (8) to the hollow section (2) whereby a portion of the cable clamp passes through the retaining strip.
Figure 17:
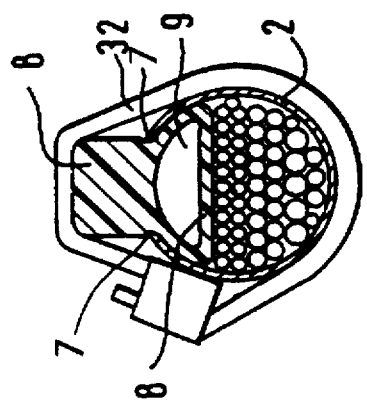
FIG. 17 is a view similar to FIG. 15, however a portion of the cable clamp (32) passes over the retaining strip (8)

FIGS. 15 and 17 show a sectional view through a cable clamp 32 that is used to hold the retaining strip 8 and thus the conductors 3 in the hollow section 2. In FIG. 15 a portion of the cable clamp 32 passes through a slot 10 in the retaining strip 8. In FIG. 17 the cable clamp 32 passes around the retaining strip 8. When the cable clamp 32 is used, the retaining strip is "stepless", namely without corrugations 26. Several such cable clamps 32 may be spaced from each other along the hollow section 2.

Figure 16:
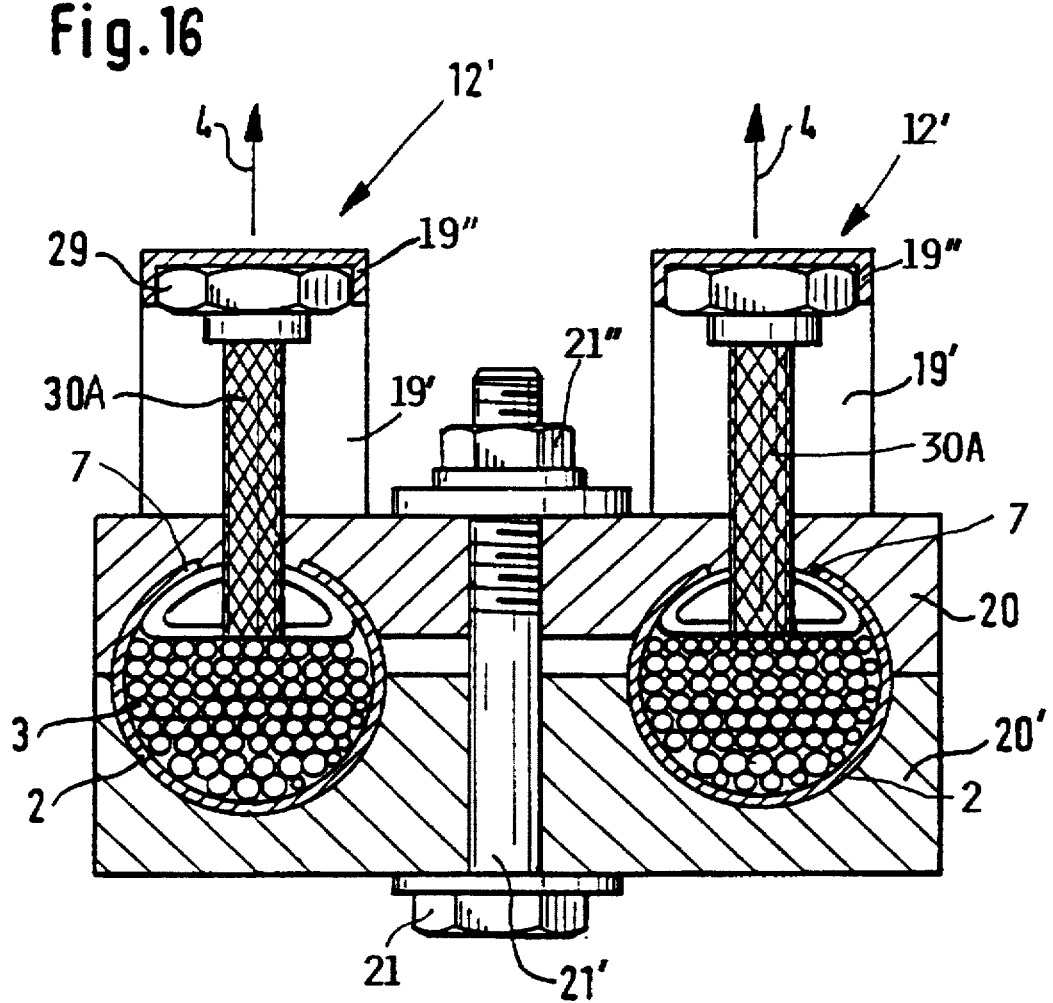
FIG. 16 shows two transition pieces (12') secured to the mounting held together by a nut and bolt connection between the transition pieces.

FIG. 16 shows two transition pieces 12' secured to the upper mounting part 20 by angular brackets 19'. The mounting parts are held together by a threaded bolt connection 21 arranged in the middle of the mounting parts 20, 20' between the hollow sections 2. The angular brackets 19' of the transition pieces 12' have bent over edges 19" holding the nut 29. Otherwise the transition pieces 12' are the same as in FIG. 14.

Figure 18:
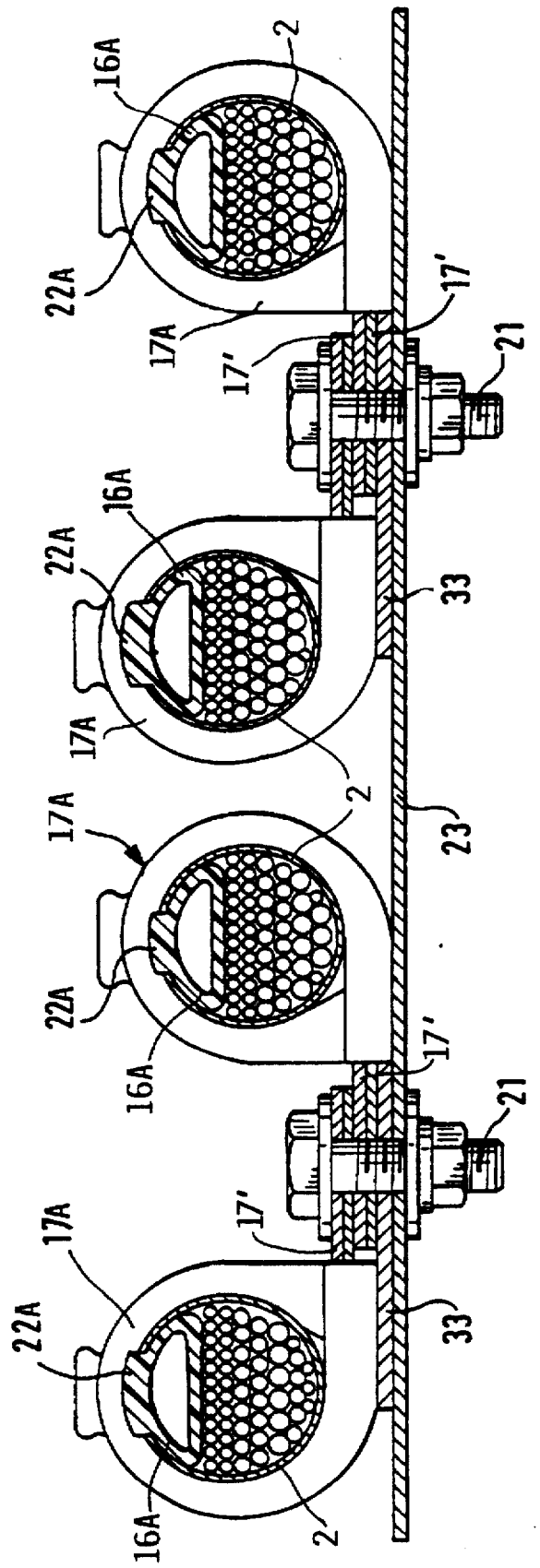
FIG. 18 shows four hollow sections (2) secured in pairs to a support (23) by pipe clamps (17A) and bolted connections (21)
Figure 19:
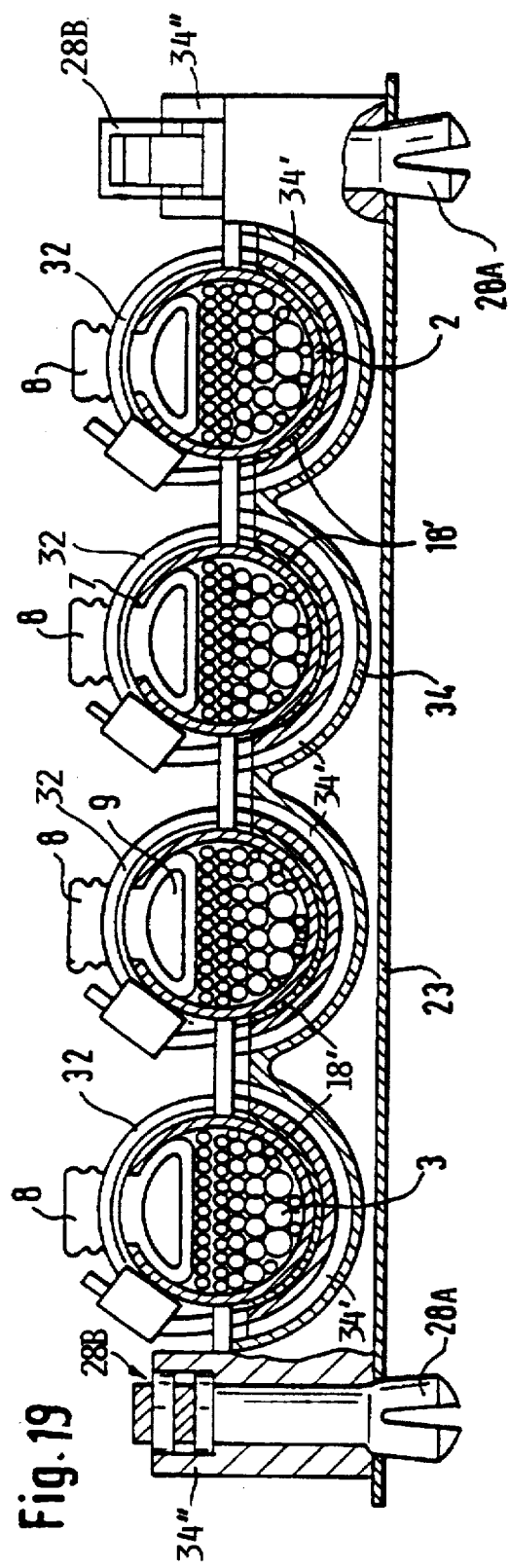
FIG. 19 shows four hollow sections (2) secured by cable clamps (32) to a mounting in the form of a half shell (34) which is mounted to a support (23) by locking members with expansion heads (28A)

FIGS. 18 and 19 show embodiments without the mounting parts 20, 20' described above. In FIG. 18 four hollow sections 2 are fastened to the support 23 by four pipe clamps 17A arranged in pairs and secured to the support 23 by bolted connections 21 passing through clamp extensions 17' and spacers 33. A rubber sleeve 16A with a saddle 22A is pushed onto each pipe clamp 17A so that the pipe clamp 17A sits in the saddle 22A while a portion of the rubber sleeve 16A projects through the slot 6 into the hollow section 2. The spacers 33 compensate height differences between the clamps 17A of a pair.

FIG. 19 shows an embodiment with four hollow sections 2 which are held in respective lower half shells 18' by cable clamps 32. The half shells 18' are held in a mounting 34, more specifically in troughs 34' formed in the mounting 34. Curved threading-in grooves are provided in the troughs 34' for the cable clamps 32 in the lower area of the half shells 18', whereby the clamps 32 are threaded through the respective groove. The mounting 34 is secured to the support 23 by expansion heads 28A passing through mounting blocks 34". Each expansion heads 28A has a clamp 28B at one end and a spreader head at the other end. The spreader head is beaten into the support 23, whereby the expansion heads 28A are held in their position when the clamps 28B are tightened, whereby the mounting is protected against vibrations and impacts.

Figure 20:
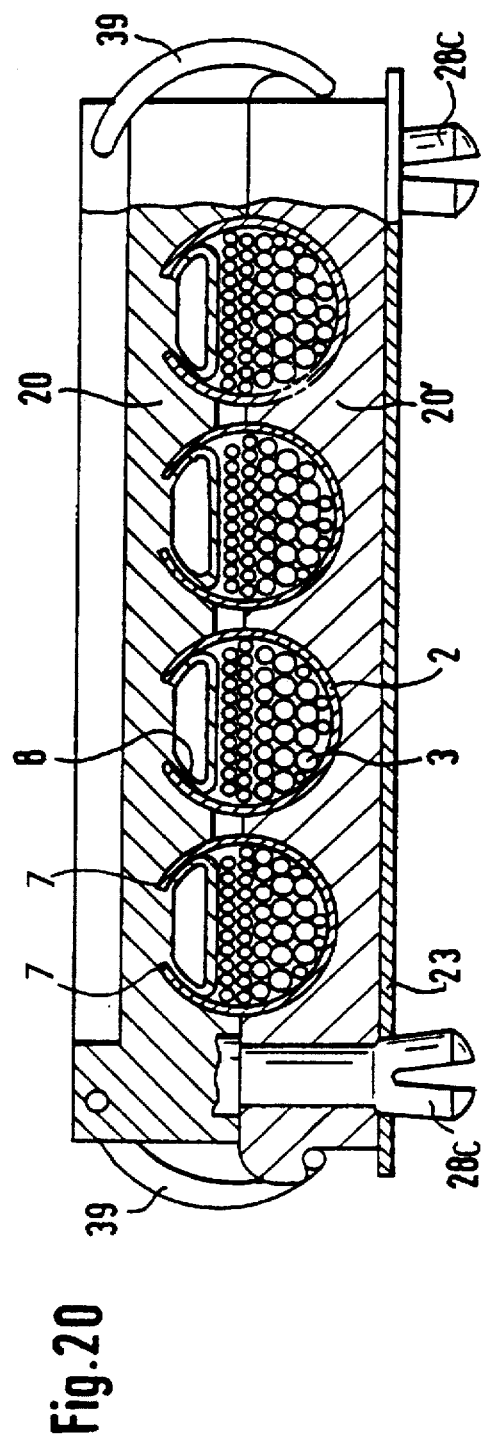
FIG. 20 is a sectional view similar to that of FIG. 3 with an elastic clamp lock (39) to hold upper and lower mounting parts (20, 20') together and the lower mounting part (20') is secured to a support (23) of expansion rivets (28C)

FIG. 20 shows a modified embodiment wherein the upper and lower mounting parts 20, 20' are held-together with metallic and elastic clamp locks 39. The hollow sections 2 are held in place between the parts 20, 20'. The lower part 20' is fixed to the support 23 with expansion head rivets 28C.

FIG. 21 shows a view similar to FIG. 10, but with the bolted connections 21 positioned between neighboring hollow sections 2 rather than outside thereof. In FIG. 21 the retaining strips 8 are seen behind the upper mounting part 20 which has stops 20A that engage the edges 7 of the hollow sections 2 as in FIGS. 9 and 10.

FIG. 22 is a view similar to that of FIGS. 14 and 16 but showing two transition pieces 12 held in place by mounting parts 20 and 20' through angular brackets 19. The parts 20 and 20' are secured to each other by a bolted connection 21 positioned outside of both transition pieces 12 rather than therebetween.

Figure 23:
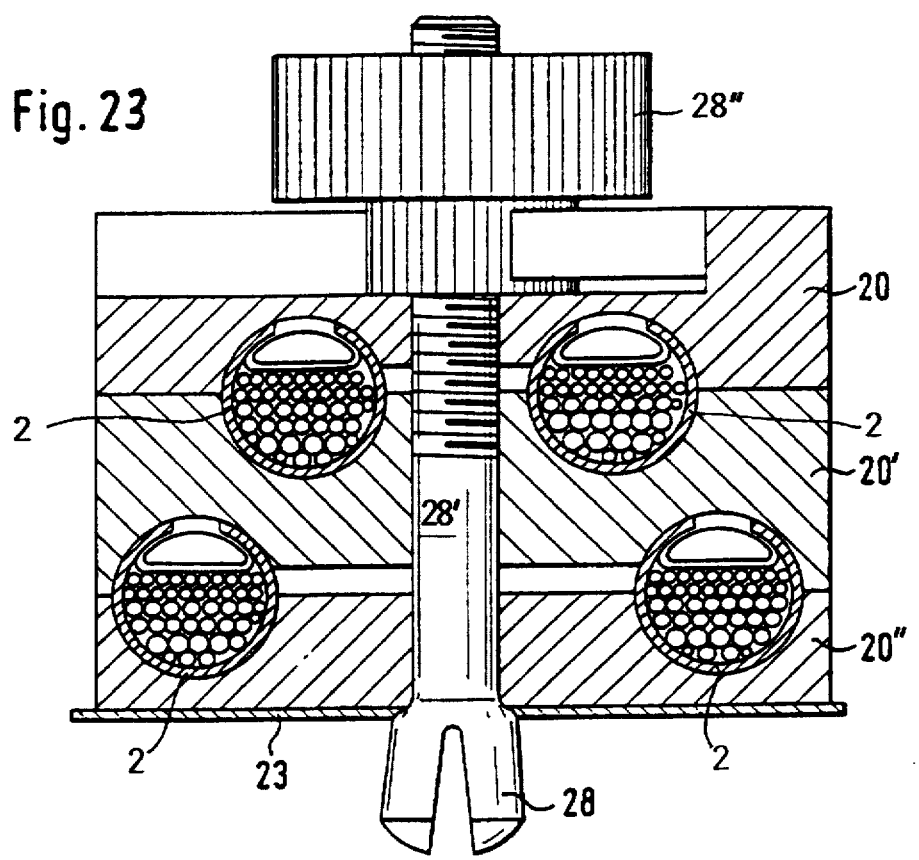
FIG. 23 is a sectional view of a mounting having three mounting parts (20, 20', 20") holding four hollow sections at two different levels.

FIG. 23 shows a modified embodiment with three mounting parts 20, 20', 20" that are fixed to a support 23 by a bolted connection with an expansion head 28, a threaded bolt 28' and a nut 28". The hollow sections 2 are vertically staggered in pairs with one pair of hollow sections positioned below the other. Transition pieces 12 not shown in FIG. 23 may be installed on the lower hollow sections 2.

Figure 24:
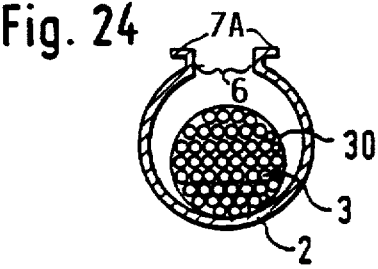
FIGS. 24, 25, 26 and 27 show four different sectional configurations of clamping edges (7A, 7B, 7C, 7D) extending along a longitudinal slot (6) in the hollow section (2)
Figure 25:
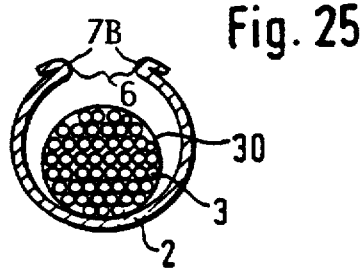
Figure 27:
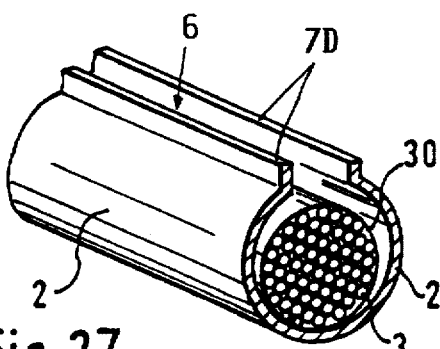
Figure 26:
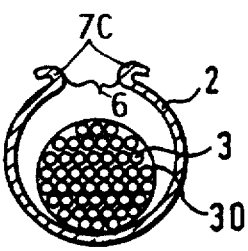

FIGS. 24, 25, 26 and 27 show four different sectional configurations for the edges 7 of the hollow sections 2. FIG. 24 shows flanged edges 7A. FIG. 25 shows edges 7B heaving a V-sectional configuration. FIG. 26 shows edges 7C having a C-sectional configuration. FIG. 27 shows perspectively edges 7D formed as parallel bars.

Figure 28:
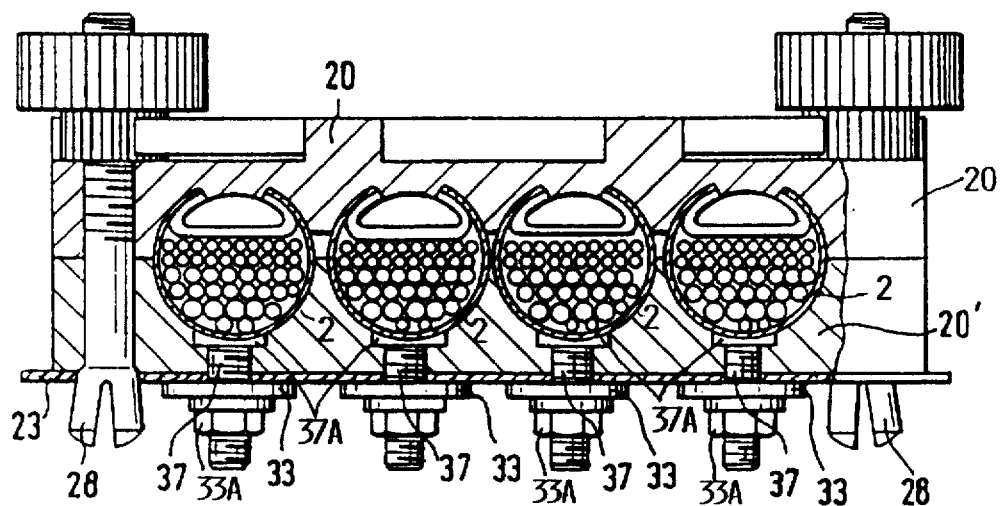
FIG. 28 shows a sectional view of a mounting wherein each hollow section (2) is individually welded to a head (37A) of a threaded stud (37) passing through the lower mounting part (20') and secured to a support (23) by a nut (33A)
Figure 29:
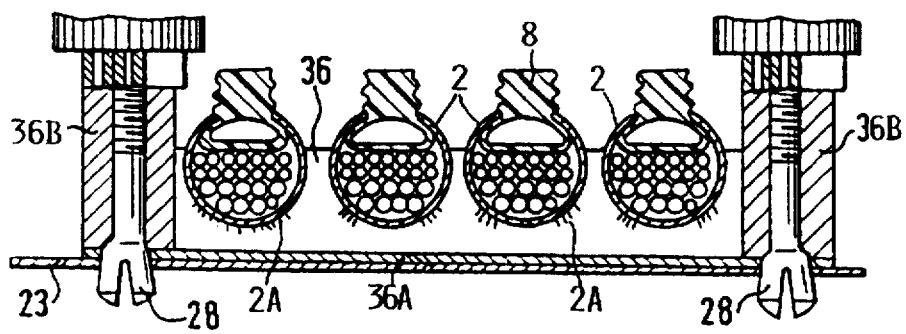
FIG. 29 shows a sectional view of four hollow sections (2) welded in a mounting formed as a U-section (36), which is attached to a support (23) by mounting blocks (36B) and by threaded bolts having expansion heads (28)
Figure 30:
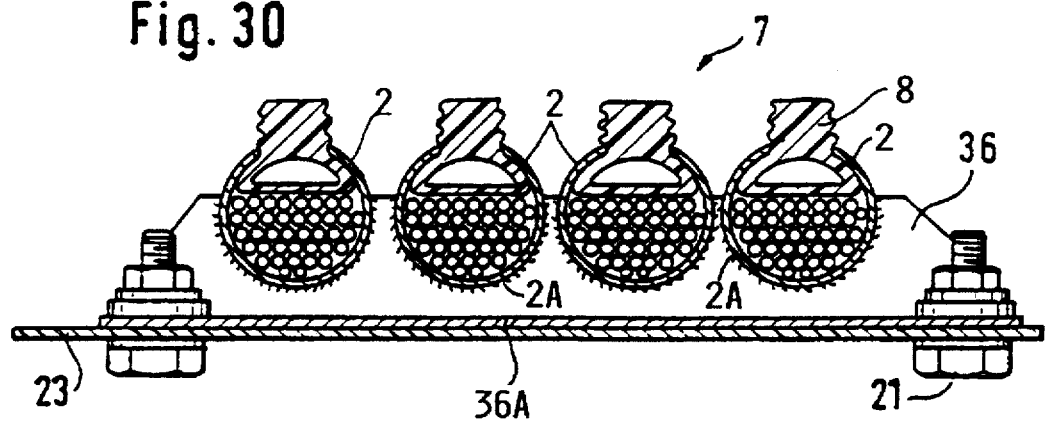
FIG. 30 shows a sectional view similar to that of FIG. 29, but the mounting blocks have been omitted, and a bottom (36A) of the U-section (36) is secured to the support (23) by a bolted connection (21)

A number of further possibilities of modifying the conductor channel according to the invention or their arrangement into a conductor channel system, is shown in FIGS. 28, 29 and 30.

FIG. 28 shows hollow sections 2 welded to heads 37A of threaded studs 37, passing through the lower electrically conducting mounting part 20' and through the support 23. Each welded stud 37 has a threaded end that is fastened to the support 23 with a nut 33A and a washer 33. The mounting parts 20, 20' are held together by threaded bolts having an expansion head 28 as described. In FIG. 28 the mounting parts 20, 20' may be made of synthetic material because the hollow sections 2 are electrically connected to the support 23 by the studs 37 which provide an adequate grounding protection. The heads 37A of the studs 37 have a shoulder that bears against the lower mounting part 20', whereby the welding between the hollow sections 2 and the studs 37 is relieved of mechanical fastening loads.

FIG. 29 shows a mounting for the hollow sections 2 in the form of a U-section 36 to which the hollow sections 2 are welded by welding seams 2A. The U-section 36 has a bottom 36A bearing against the support 23 and held in place by mounting blocks 36B which in turn are secured to the support 23 by threaded bolts with expansion heads 28.

FIG. 30 is a view similar to that of FIG. 29. The welding seams 2A again secure the hollow sections 2 to the U-section 36. However, the bottom 36A is secured to the support 23 by threaded bolt connections 21 without any mounting blocks.

The diameter of the hollow sections 2, 2' does not need to be the same in any of the illustrated embodiments. Even in welded constructions shown in FIGS. 29 and 30 hollow sections 2, 2' of different diameters may be welded to the U-section 36.

Figure 31:
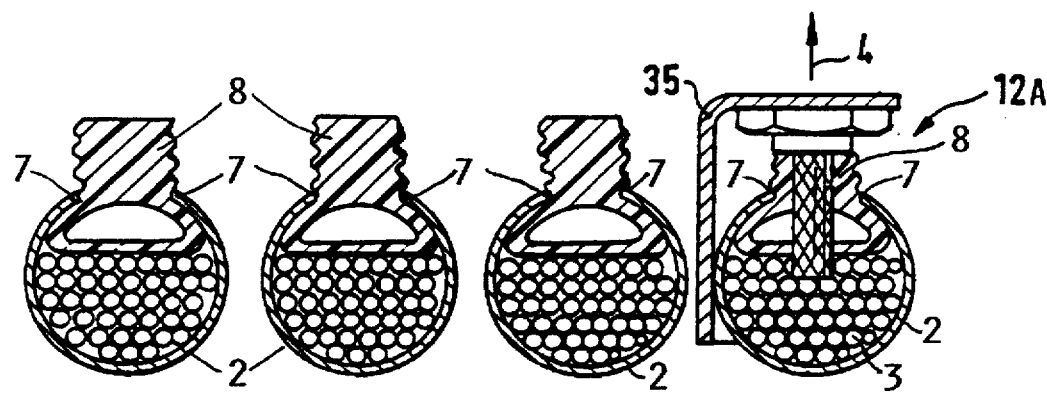
FIG. 31 shows a transition piece (12A) formed as an angular stock (35) for coupling hollow sections (2) and the conductors (3) to other sections and other conductors, respectively.

FIG. 31 shows a transition piece 12A cut from angular stock 35 and secured to the hollow sections 2 or at least one hollow section. Otherwise the transition piece 12 functions in the same way as described above with reference to FIGS. 14, 16 and 22.

Figure 32:
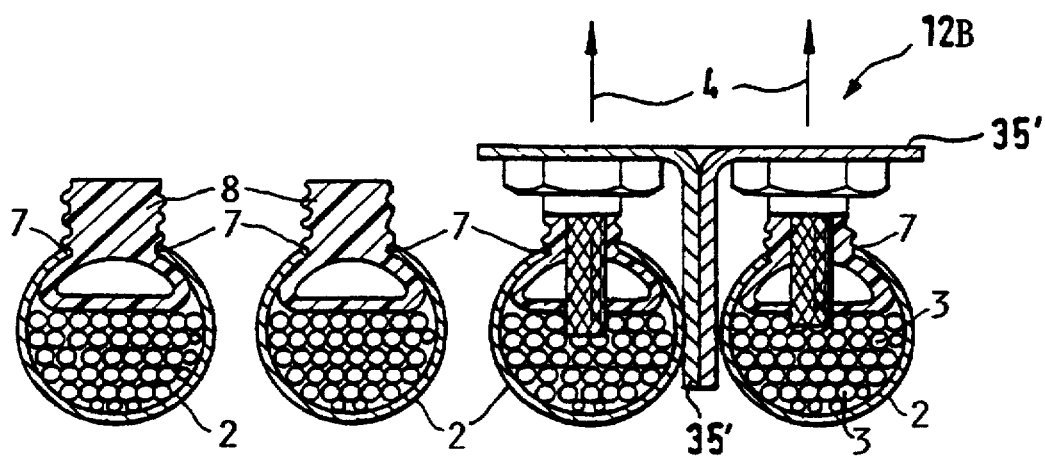
FIG. 32 is a view similar to that of FIG. 31, wherein a transition piece (12B) is formed as a double angular section (35; 35')

FIG. 32 shows a transition piece 12B combining two angular stock sections 35' arranged back-to-back to provide transition connections 4 for the conductors 3 in two neighboring hollow sections.

Figure 33:
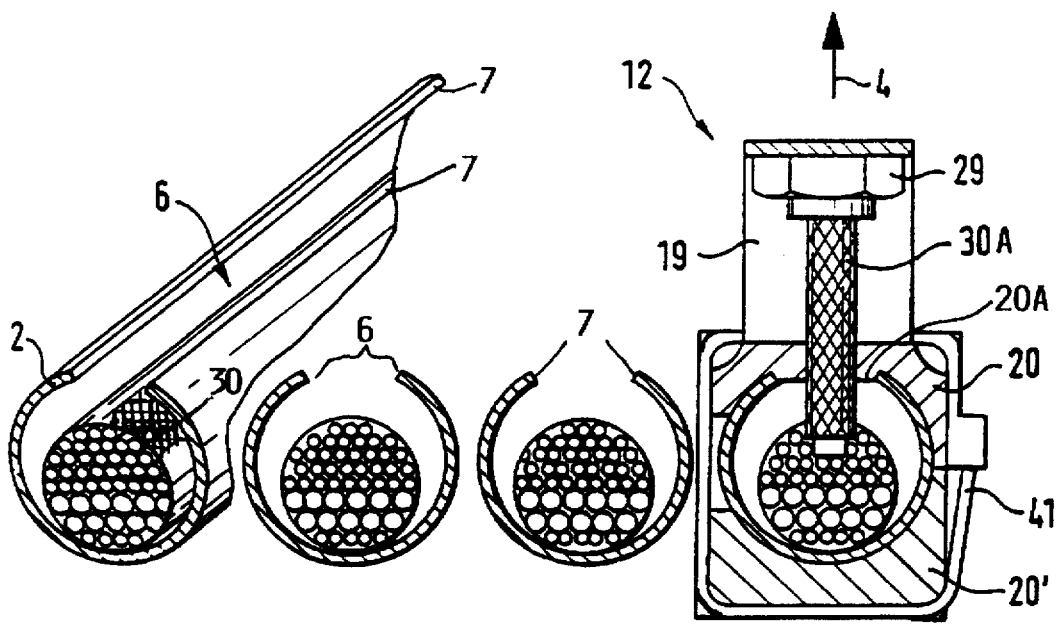
FIG. 33 shows how a transition piece (12) and upper and lower mounting parts (20, 20') are held together by a cable clamp (41)
Figure 34:
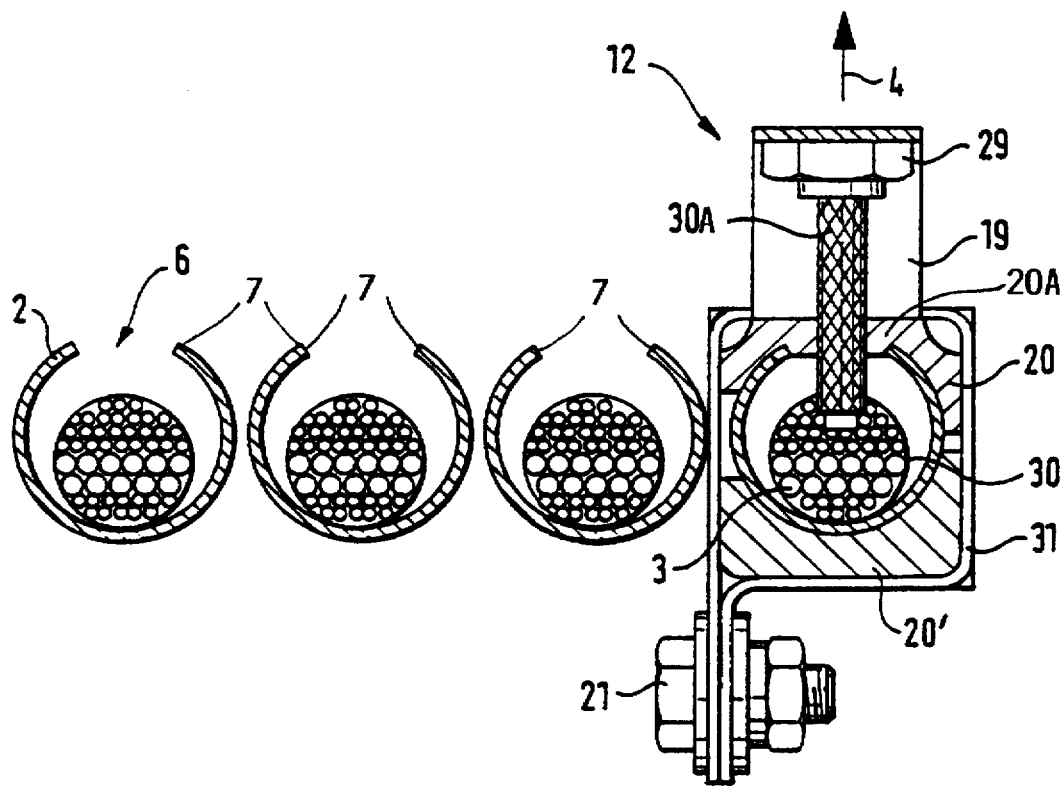
FIG. 34 shows how upper and lower mounting parts (20, 20') and a transition piece (12) are held together by a strap (31) the ends of which are bolted together at (21)

FIGS. 33 and 34 show a modification of the mounting of the transition piece 12. In FIG. 33 the transition piece 12 and the mounting parts 20 and 20' and the transition piece are held together by a cable clamp 41. In FIG. 34 the mounting parts 20 and 20' are held together by a bolted strap 31 secured by a threaded bolt connection 21. Lead out conductors are enclosed by a mesh hose 30A.

Figure 35:
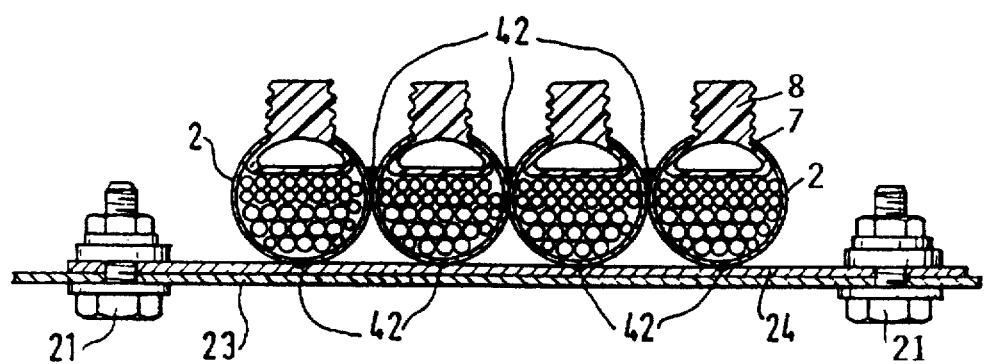
FIG. 35 shows an embodiment, wherein the mounting is a flat member (24) to which the hollow sections (2) are welded, whereby the hollow sections are preferably also welded to each other by spot welding and/or gusset welding (42).

FIG. 35 shows a modified mounting of the hollow metal sections 2 to a flat mounting member 24 which is secured to the support 23. The hollow sections are welded at 42 to the mounting member 24 and to each other, whereby either spot welding or welded gusset seams may be used. Spacings between the hollow sections are avoided. Due to the welding 42 the hollow sections 2 are electrically connected to each other.

In all disclosed embodiments of the conductor channel or the conductor channel system, it is possible that the filler body 9 in the hollow space in the retaining strip 8 may be replaced by a supply of compressed air. For this purpose one of the closed ends of the retaining strip 8 is to be provided with a controllable valve. The compressed air in the retaining strip 8 makes sure, just as the filler body 9, that the space in the hollow section 2 is filled to its maximum. The compressed air holds down the conductors 3 inside the hollow section 2 to an optimal extent.

All the present mounting parts 20, 20', 20", can be made of synthetic material, provided that the conducting hollow sections 2 are properly connectable to an electrical grounding as a protective measure against electrical dangers. As an alternative, one or several hollow sections 2 can be fixed to the conducting support 23 using a pipe clamp 17A of metal, which has a sufficient electrical contact with the hollow section 2. The connection with the support 23 can be made by a grounding strip. Additionally, these mounting parts can suitably be provided with metallic elements, which have an electrically conducting contact with the hollow sections 2. The metallic elements can be connected with the conducting support 23. Other embodiments are possible wherein plane or wavy, but flexible spring washers are installed on the circumference of the mounted hollow sections 2. The electrical connection of the spring washers with the support structure 23 may be provided by a screw.

Although the invention has been described with reference to specific example embodiments, it will be appreciated that it is intended to cover all modifications and equivalents within the scope of the appended claims.

We claim:

1. A conductor channel for installing insulated electrical conductors in an aircraft or a spacecraft, comprising at least one hollow section made of an electrically conductive material having a section wall and a longitudinal slot in said section wall forming clamping edges in said section wall, a retaining strip held by said clamping edges in said hollow section, said retaining strip extending substantially along an entire length of said conductor channel, an elastically deformable filler body enclosed in said retaining strip, said filler body pressing said retaining strip against said clamping edges of said hollow section, an abrasion protection for said insulated electrical conductors inside said hollow section, at least one transition piece secured to said hollow section for connecting said hollow section to another system, and at least one tension relief device connected to at least one end of said hollow section so that said insulated electrical conductors are relieved of tension loads, at least one mounting for electrically connecting and grounding said electrically conducting hollow section to a grounding support, wherein said transition piece extends into said hollow section through said longitudinal slot for holding said electrically insulated conductors in said hollow section, and wherein said transition piece is adapted for providing an electrically grounding connection to another protective conductor system or to other electrical systems.

2. The conductor channel of claim 1, wherein said hollow section is made of a surface-treated sheet metal having a surface with a coating selected from chromium, cadmium, nickel, silver, gold, and a galvanized surface.

3. The conductor channel of claim 1, wherein said retaining strip is made of a conductive synthetic material metal combination including at least one metal selected from the group of gold, silver, copper, aluminum, nickel, and iron, and wherein said retaining strip has a surface covered with a conductive layer selected from the group of gold, silver, copper, cobalt, chromium, indium, rhodium, tellurium, tantalum, a chromium nickel alloy, and an iron nickel alloy.

4. The conductor channel of claim 1, wherein said retaining strip has side faces with corrugations therein, said side faces bearing at least partly against said section wall of said hollow section, and wherein said retaining strip is made of an electrical conductive material which is electrically conductive at least at its surface.

5. The conductor channel of claim 1, wherein said filler body is made of a material selected from expanded rubber, sponge rubber, and synthetic material, and wherein said retaining strip has a sectional configuration adapted to a configuration of said wall of said hollow section for fixing said insulated electrical conductors inside said hollow section.

6. The conductor channel of claim 1, wherein said abrasion protection is made as a lining inserted into said hollow section, said lining being made of one of synthetic material, a rubber-elastic coating, and a fabric coating.

7. The conductor channel of claim 1, wherein said mounting comprises a first mounting part and a second mounting part for holding at least one hollow section, said mounting parts being made of a material selected from the group of iron, cast iron, nonferrous metal, light metal, conductive synthetic material, and nonconductive synthetic material, said mounting further comprising connectors for securing said first and second parts to each other and said hollow section to a support, said first part comprising a stop reaching into said longitudinal slot of said hollow section and wherein said transition piece comprises a bracket secured to one of said first and second parts for fastening a conductor lead through connection to said hollow section.

8. The conductor channel of claim 1, wherein said tension relief device comprises a support bushing including a first half shell and a second half shell, said half shells being made of a metallic material, and an electrically conductive connection securing said half shells to said hollow section, said electrically conductive connection comprising an elastomeric insert made of a rubber sleeve forming said abrasion protection, said tension relief device further comprising a clamping element.

9. The conductor channel of claim 1, wherein said abrasion protection comprises a protective tubing enclosing said insulated electrical conductors in said hollow section.

10. The conductor channel of claim 1, further comprising a conducting layer covering said retaining strip, said conducting layer having an ability for an elastic deformation, said conducting layer further having a cross-section conforming to said retaining strip, said conducting layer being made of a material corresponding to material of which said hollow section is made, said conducting layer having an electrically conducting contact with said retaining strip and with said hollow section.

11. The conductor channel of claim 1, further comprising a cable clamp attached to said hollow section for securing said hollow section to a support.

12. The conductor channel of claim 1, further comprising a tubular pipe clamp including an elastomeric sleeve in said tubular pipe clamp for holding said insulated electrical conductors in said hollow section.

13. The conductor channel of claim 1, wherein said mounting comprises at least two mounting parts made of a material selected from iron, cast iron, nonferrous metal, light metal, and a conductive synthetic material.

14. The conductor channel of claim 1, further comprising a spacer including two spacer mounting parts made of a synthetic material for holding a plurality of hollow sections together.

15. The conductor channel of claim 1, comprising a plurality of hollow sections made of an electrically conducting material arranged parallel to each other, each of said hollow sections having said section wall and said longitudinal slot forming retaining edges, said section wall having an exterior surface welded to a metallic mounting member and a welded joint between each of two neighboring hollow sections.

16. The conductor channel of claim 1, wherein said hollow section is made of a material selected from the group consisting of copper, aluminum alloy, anodized aluminum and anodized aluminum alloy.

* * * * *

UNITED STATES PATENT AND TRADEMARK OFFICE
CERTIFICATE OF CORRECTION

PATENT NO. : 5,723,819
DATED : Mar. 3, 1998
INVENTOR(S) : Kirma et al.

It is certified that error appears in the above-identified patent and that said Letters Patent is hereby corrected as shown below.

On the title page, under [56] FOREIGN PATENT DOCUMENTS,
line 1, delete "20379722" and instead insert --0379722--;

Col. 4, line 31, after "strip" delete "(SA)" and instead insert --(8A)--;
line 34, after "strip" delete "(SB)" and instead insert --(8B)--;

Col. 14, line 34, after "second" insert --mounting--.

Signed and Sealed this

Sixteenth Day of June, 1998

Attest:

BRUCE LEHMAN

Attesting Officer     Commissioner of Patents and Trademarks